United States Patent [19]

Dail

[11] 4,002,847
[45] Jan. 11, 1977

[54] FAULT ISOLATION IN A SERIAL-LOOPED TRANSMISSION SYSTEM

[75] Inventor: James Edward Dail, Budd Lake, N.J.

[73] Assignee: Bell Telephone Laboratories, Incorporated, Murray Hill, N.J.

[22] Filed: Dec. 29, 1975

[21] Appl. No.: 645,022

[52] U.S. Cl. .................... 179/15 AL; 179/15 BF
[51] Int. Cl.² ........................................ H04J 3/14
[58] Field of Search ... 179/15 AL, 15 BF, 175.31 R; 325/2; 340/146.1 BE, 146.1 E

[56] References Cited

UNITED STATES PATENTS

| | | | |
|---|---|---|---|
| 3,458,661 | 7/1969 | Forde | 179/15 BF |
| 3,519,935 | 7/1970 | Hochgraf | 179/15 AL |
| 3,551,610 | 12/1970 | Pichot | 179/175.31 |
| 3,652,798 | 3/1972 | McNeilly | 179/15 AL |
| 3,758,728 | 9/1973 | LeRoch | 179/175.31 |
| 3,859,468 | 1/1975 | Smith | 179/15 AL |
| 3,870,955 | 3/1975 | Ouvrier | 325/2 |

Primary Examiner—David L. Stewart
Attorney, Agent, or Firm—Robert O. Nimtz

[57] ABSTRACT

A serial looped transmission system is disclosed which includes a central terminal and a number of remote terminals for two-way communication between the various terminals on a single looped transmission facility. Each terminal includes multiplexing and demultiplexing equipment for taking signals off and placing signals on the common transmission line.

Failures in any link of this system cause the entire system to fail. Loopbacks placed at each terminal permit restoration of service to the operative portion of the system. Testing the system in order to place such loopbacks is accomplished by common timing and testing equipment at the central terminal which takes into account the variances in start-up time for different sizes of the operating system. Loopback instabilities due to timing variances are overcome by placing the central terminal in overall control of the loopback sequence.

10 Claims, 13 Drawing Figures

SERIAL LOOP TRANSMISSION SYSTEM

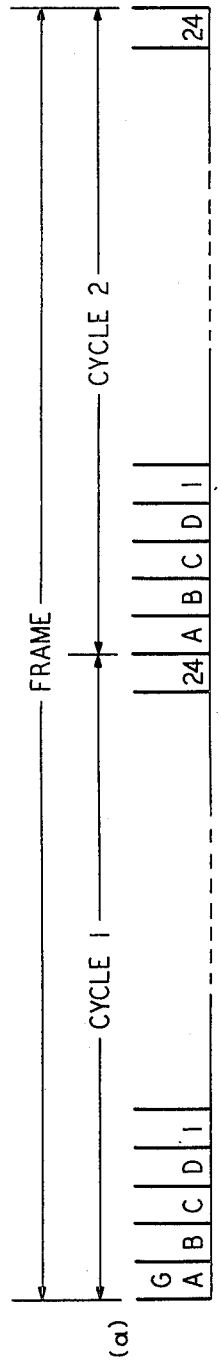
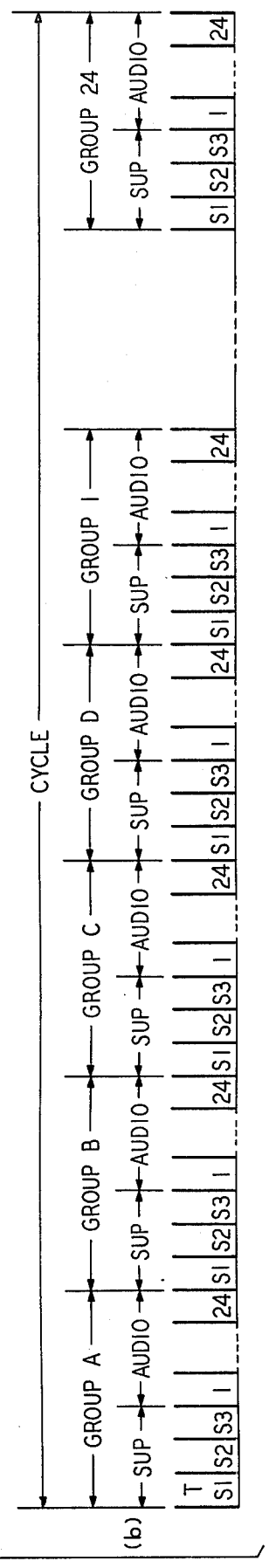
FIG. 4 BIT STREAM TIMING DIAGRAM
FRAME RATE = 1.02 kHz
CYCLE RATE = 2.04 kHz
GROUP RATE = 57.2 kHz
BIT RATE = 1.544 MHz

TIMING GENERATOR

LOOPBACK CIRCUITS

LINE FAULT DETECTORS

LOOPBACK TIMER CIRCUIT

LOOPBACK CONTROL CIRCUITS

LOOP TEST TIMER

REMOTE TERMINAL

REMOTE LOOPBACK CIRCUITS

FAULT ISOLATION IN A SERIAL-LOOPED TRANSMISSION SYSTEM

BACKGROUND OF THE INVENTION

1. Field of the Invention

This invention relates to multiplex serial loop transmission systems and, more particularly, to fault isolation and partial service restoration in such systems.

2. Description of the Prior Art

J. P. Forde et al U.S. Pat. No. 3,458,661 granted July 29, 1969, and L. Hochgraf U.S. Pat. No. 3,519,935, granted July 7, 1970, each disclose a serial loop transmission system in which partial service restoration is effected by looping the repeatered line back to a central terminal on the central terminal side of detected faults. This permits maximum possible service with the faulty system and isolates the location of the fault to speed up repair and restoration of full service.

One difficulty with the systems described in the aforementioned patents is the wide variances in the start-up time for the various different configurations and different loop lengths of the looped-back system. If sufficient time is not allowed for full system start-up before testing the system for faults, a fault can be indicated when one has not, in fact, occurred. Moreover, if a remote terminal initiates a loopback in response to a fault on the outgoing link before the central terminal is able to detect that fault, the central terminal is unable to pinpoint the location of the fault and provide an indication to service personnel of that location. Such an unrecognized fault can lead to an oscillatory condition where the central terminal continually tries to add a link while the remote terminal continually attempts to remove that link.

Yet another problem in the prior art loopback systems arises when portions of the system are powered from remotely located power supplies. Attempts to locate faults beyond the remote powering position cause a failure due to the lack of a complete powering path which, in turn, masks the locations of actual faults in the transmission system beyond that point.

SUMMARY OF THE INVENTION

In accordance with the illustrative embodiment of the present invention, a serial loop transmission system is equipped with loopback fault isolation and service restoration circuits which include timing delays and test time-out circuits which insure that the system has ample opportunity to reach a full operating condition before registering a failure, while at the same time detecting proper operation as soon as it occurs. At the same time, the remote terminals operate their local loopback circuits rapidly in response to a loss of input signal, but restore such loopback circuits only after a substantial delay, thus permitting the central office to continue testing the looped-back system.

In particular, loop tests are under the control of two timing circuits. The first timing circuit provides a testing interval of sufficient length to insure that the system has had time to start up under even the most adverse conditions. The second timer, on the other hand, indicates that the line is continuously good during a minimum testing period required to accurately detect successful operation.

These improvements in the loopback testing arrangement are of considerable importance in maintaining the maximum possible service on the system in a minimum amount of testing time. In this way, service interruptions are also kept at a minimum.

BRIEF DESCRIPTION OF THE DRAWINGS

FIG. 4 is a graphical representation of the format of the bit stream of a time division multiplex signal transmitted from the multiplex terminal of FIG. 2;

DETAILED DESCRIPTION

Figure 1:
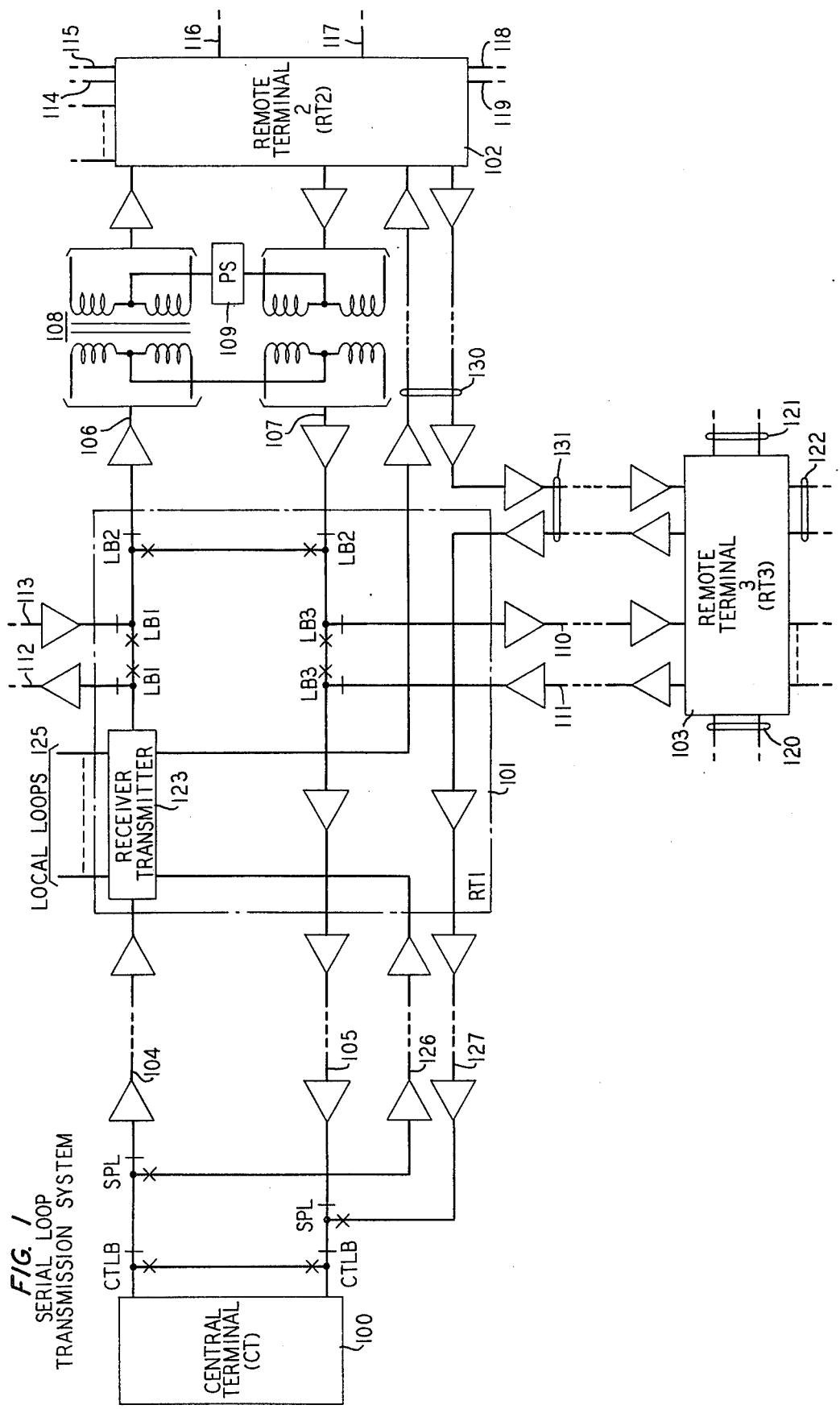
FIG. 1 is a general block diagram of a multiplexed loop transmission system which utilizes a loopback testing arrangement in accordance with the present invention.

The serial loop transmission system of FIG. 1 includes a central terminal 100 and a plurality of remote terminals 101, 102, and 103. Central terminal 100 is connected to remote terminal 101 by repeatered transmission lines 104 (outgoing) and 105 (incoming). Spare transmission lines 126 and 127 are provided as an alternate redundant transmission path between central terminal 100 and remote terminal 101. Similarly, remote terminal 101 is connected to remote terminal 102 by main repeatered lines 106 and 107 and spare lines 130. The optional remote powering point 108 is included in repeatered lines 106 and 107, by means of which a power supply 109 is used to supply power to remote terminal 102 and to other remote terminals connected beyond remote terminal 102.

Remote terminal 103 is connected to remote terminal 101 by main repeatered lines 110 and 111 and spare lines 131. Similarly, remote terminal 101 can be connected to yet other remote terminals by way of repeatered lines 112 and 113 and remote terminal 102 can be connected to further remote terminals by way of repeatered lines 114, 115, lines 116, 117, or lines 118, 119, (all together with appropriate spare lines). Remote terminal 103 can also be connected to further remote terminals by way of repeatered lines 120, 121, and 122 (and appropriate spare lines).

It can be seen that the serial loop tansmission system of FIG. 1 comprises a network of interconnected remote terminals identical to remote terminal 101, each of which provides serial connections to a plurality of other remote terminals. The system of spare lines between these terminals permits the system to continue full operation if a line failure occurs in the main line.

As can be seen in remote terminal 101, the links connecting terminal 101 to other remote terminals can be looped back so as to be switched out of the serial loop transmission system by means of transfer contacts LB1, LB2, and LB3. These contacts are operated by relays under the control of detection circuits in remote terminal 101 which respond to loss of the received signal or to encoded commands transmitted from central terminal 100. The spare lines do not include such loopback capabilities.

Each of remote terminals 101, 102, and 103 includes a receiver-transmitter such as receiver-transmitter 123 in remote terminal 101. Receiver-transmitter 123 detects signals on incoming lines and retransmits these signals on the outgoing lines. At the same time, receiver-transmitter circuits 123 decompose such signals into a number of channels and deliver these signals to appropriate lines of local loops 125, and also delivers signals from circuits 125 to the serial loop system.

Spare lines comprising outgoing line 126 and incoming line 127 are provided to permit the serial loop transmission system to operate on the spare lines whenever faults occur on the main line comprising repeatered transmission lines 104 and 105, et cetera. This spare line extends throughout the serial loop transmission system and provides higher level of reliability for the system. Transfer contacts SPL are provided at the central terminal 100 to switch to these spare lines. Similar contacts are provided at each of the remote terminals 101, 102, and 103. The central terminal 100 of FIG. 1 can be any multiplex terminal, either frequency or time-divided, to afford a plurality of channels on the repeatered lines 104 and 105.

Figure 2:
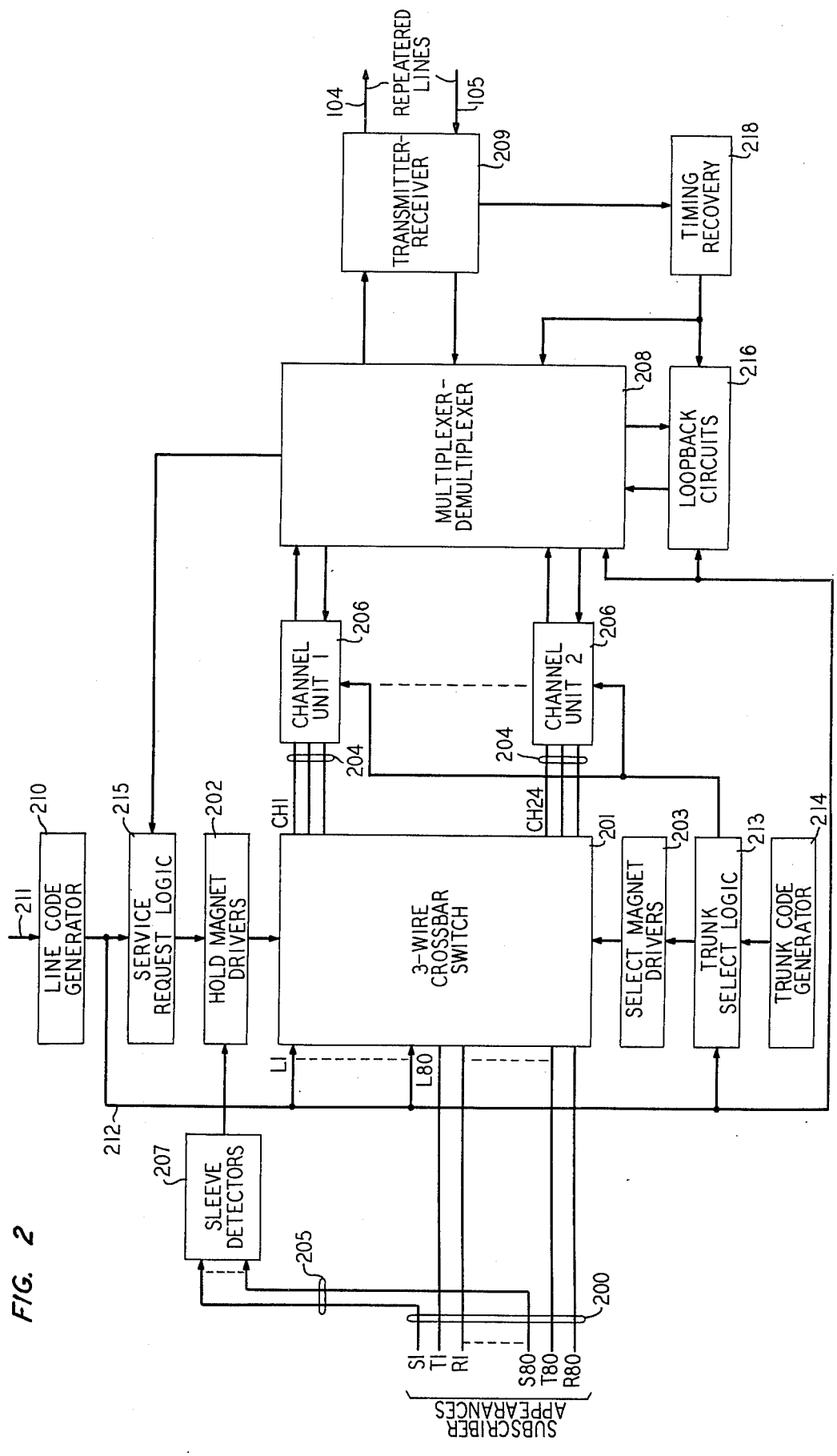
FIG. 2 is a more detailed block diagram of the central multiplex terminal of the serial loop transmission system of FIG. 1.

In the illustrative embodiment of the invention shown in more detail in FIG. 2, it is assumed that normal telephone subscriber service is afforded over a switched and time-divided multiplex transmission system. Thus the tip and ring conductors 200 of 80 telephone subscriber appearances are connected to the verticals of a three-wire crossbar switch 201. Under the control of signals from hold magnet drivers 202 and select magnet drivers 203, metallic connections are established selectively between any one of subscriber appearances 200 and any one of twenty-four channel circuits 204. These connections are established in response to requests for service to a particular subscriber from the telephone central office of sleeve leads 205, or in response to requests generated by remote subscribers going off-hook. In response to such signals, crossbar switch 201 establishes a connection between the appropriate one of subscriber appearances 200 and an idle one of channel circuits 204.

Channel units 206 are provided, one for each of the channel circuits 204, to convert the analog voice signals to a digital pulse stream. Multiplexer-demultiplexer circuit 208 interleaves these pulse streams into a single multiplexed stream of pulses for transmission on repeatered line 104. A similar received bit stream on repeatered line 105 is received in transmitter-receiver 209, decomposed in multiplexer-demultiplexer 208 and delivered to the appropriate one of channel units 206. Analog signals are therefore delivered back through crossbar switch 201 to subscriber appearances 200 in the central office.

Hold magnet drivers 202 are under the control of sleeve detectors 207 and service request logic 215. Sleeve leads 205 indicate requests for service from the central office, while service request logic 215 indicates requests for service from the serial loop subscribers. A line code generator 210 generates a sequence of 128 line codes in response to line scan clock signals on lead 211. These line codes are delivered by way of leads 212 to the third wire on crossbar switch 201. Trunk select logic 213 responds to trunk codes generated in trunk code generator 214 and line code scan signals delivered on leads 212 to find an idle trunk. The idle trunk code is delivered to select magnet drivers 203 to operate the appropriate select magnet of crossbar switch 201 to establish a connection between the line requesting service and this next idle trunk.

Loopback circuits 216 are connected to multiplexer-demultiplexer 208 to transmit appropriate signals to the remote terminals to control the loopback sequence. Loopback circuits 216 are under the control of the current line code being generated by line code generator 210. As will be described in detail hereinafter, loopback circuits 216 respond to a fault in the received bit stream on line 105, or a manual signal, to interrupt the output bit stream and thereby cause all of the remote terminals to insert loopbacks around all of the remote links. Thereafter, under the control of "remove loopback" signals from loopback circuit 216, the remote links are restored, one at a time, and tested. Those links which are faulty are marked as such in loopback circuits 216 and the testing sequence continued until all faulty links have been identified. Thereafter, only the faulty links are looped back and the remainder of the system is allowed to operate to restore partial service to remote subscribers.

Loopback circuits 216 also control the switching of the serial loop transmission system to the spare lines 126 and 127 (FIG.1). In operation, the detection of a fault on the main line causes a switch to the spare line immediately so as to prevent loss of service to the busy subscribers. In response to a fault on the spare line, or in response to a manual signal, the loopback sequence is initiated to isolate all of the faults in the remote links of the main line and to restore service to that portion of the serial loop transmission system which is still operative.

Figure 3:
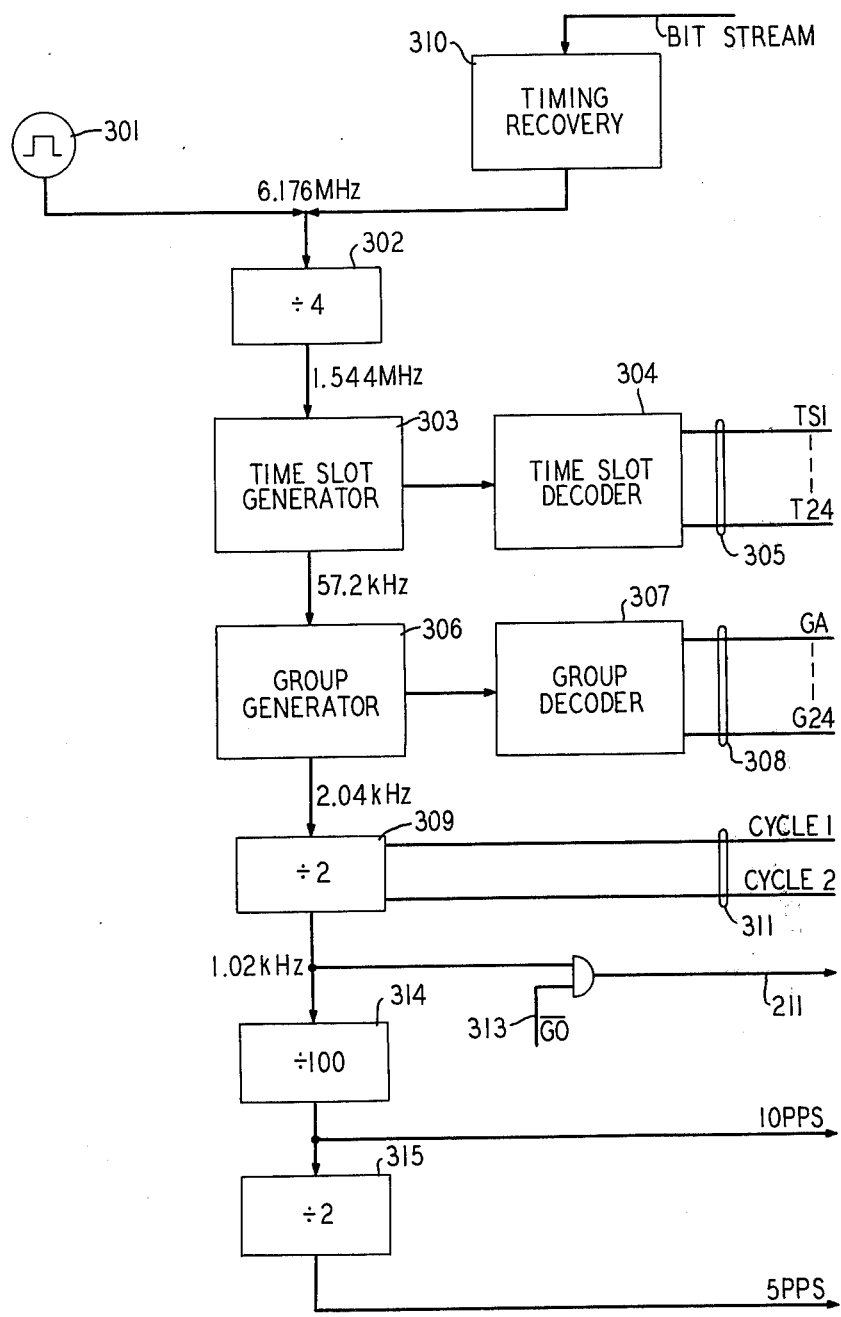
FIG. 3 is a block diagram of a timing generator useful in generating timing signals necessary to operate the multiplex terminal of FIG. 2.

In FIG. 3 there is shown a timing generator useful in operating the central and remote terminals of the transmission system from FIG. 1. The timing generator includes a clock 301 which delivers pulses to a divider circuit 302. Clock signals occur at a rate of 6.176 MHz. After division in divider circuit 302, pulse stream at 1.544 MHz is delivered to a time-slot code generator 303. This 1.544 MHz is the bit rate transmitted through the repeatered lines of the transmission system of FIG. 1. The 1.544 MHz signal for the multiplex receiver is derived from a clock recovery circuit 310 in the receiver and delivered through divider 302 to generator 303. Separate timing generators are provided for the transmitter and the receiver.

The codes from code generator 303 are delivered to a time-slot decoder 304 to provide signals sequentially on one out of twenty-seven output leads 305 to control the gating of pulse signals in these time-slots.

The output of generator 303 is delivered to a group code generator 306 which delivers a sequence of 28 codes to group decoder 307. Group decoder 307 decodes these signals and supplies timing signals on output leads 308. The output of group code generator 306 is delivered to cycle counter 309 which supplies its output to output leads 311. Timing pulses are thus delivered alternately to the two output leads 311. The output of cycle counter 309 is also delivered to AND gate 312 which, when enabled by a GO signal on lead 313, enables the line scan clock pulses on lead 211. This line scan clock is delivered to the line code generator 210 of FIG. 2.

The output of cycle counter 309 is also supplied to a divider string comprising dividers 314 and 315 which supply timing pulses of 10PPS and 5PPS to other parts of the circuit.

The timing generator of FIG. 3 can be more readily understood by considering the bit stream timing diagrams of FIG. 4. In FIG. 4 the timing diagram at (a) represents a single frame of the bit stream transmitted on the serial loop transmission system. Each frame is divided into two cycles, cycle 1 and cycle 2. The frame rate is 1.02 kHz and hence the cycle rate is 2.04 kHz.

Each cycle, as shown in waveform (b), is divided into 28 groups of pulse positions. The first four groups of each cycle are labeled A, B, C, and D. The remaining 24 groups are identified as group 1 through 24 and correspond to like numbered channels in the transmission system.

Each group of each cycle is divided into 27 bit positions. The first three of these positions, labeled S1, S2, and S3, are reserved for supervisory control signals. The remaining twenty-four bit positions of each group are labeled 1 through 24 and each bit position contains one bit of the coded signal being transmitted on the like numbered channel.

The assignment of the supervisory bit positions of each group are shown in Tables 1 and 2. These assignments include such things as framing bits, line code bits, companding bits, and various other supervisory control signals. The supervisory bits, among other things, serve to transmit the assignment of channels to local loops at the remote terminal. Coin control signals, various subscriber line test control signals, normal telephone supervision such as switchhook detection, ringing and dial pulse, are likewise accommodated in these supervisory bit positions.

TABLE I

| CYCLE 1 SUPERVISORY BIT ASSIGNMENTS | |
|---|---|
| Group A | |
| S1 | Framing Bit 1 |
| S2 | Framing Bit 2 |
| S3 | Scanning Line Code Bit 1 |
| Group B | |
| S1 | Scanning Line Code Bit 2 |
| S2 | Scanning Line Code Bit 3 |
| S3 | Scanning Line Code Bit 4 |
| Group C | |
| S1 | Scanning Line Code Bit 5 |
| S2 | Scanning Line Code Bit 6 |
| S3 | Scanning Line Code bit 7 |
| Group D | |
| S1 | Busy Line Indication (Line Ident. Above) |
| S2 | Slow Switchhook Scan (Line Ident. Above) |
| S3 | Ringing Phase (Line Ident. Above) |
| Groups 1–24 | |
| S1 | Channel Assignment, Channel n |
| S2 | Fast Switchhook Scan, Channel n |
| S3 | Ring Channel n |

TABLE II

| CYCLE 2 SUPERVISORY BIT ASSIGNMENTS | |
|---|---|
| Group A | |
| S1 | DC Power Alarm - Remote Terminal |
| S2 | AC Power Failure - Remote Terminal |
| S3 | Temperature Failure - Remote Terminal |
| Group B | |
| S1 | Overtime Coin Check |
| S2 | Coin Check |
| S3 | Polarity of Talking Battery |
| Group C | |
| S1 | Timing Control - Subscriber Line Maintenance |
| S2 | Start Test - Subscriber Line Maintenance |
| S3 | Ringer Test - Subscriber Line Maintenance |
| Group D | |
| S1 | 40 PPS |
| S2 | Coin Collect |
| S3 | Coin Refund |
| Groups 1–24 | |
| S1 | Companding Bit 1 - Channel n |
| S2 | Companding Bit 2 - Channel n |
| S3 | Companding Bit 3 - Channel n |

Figure 5:
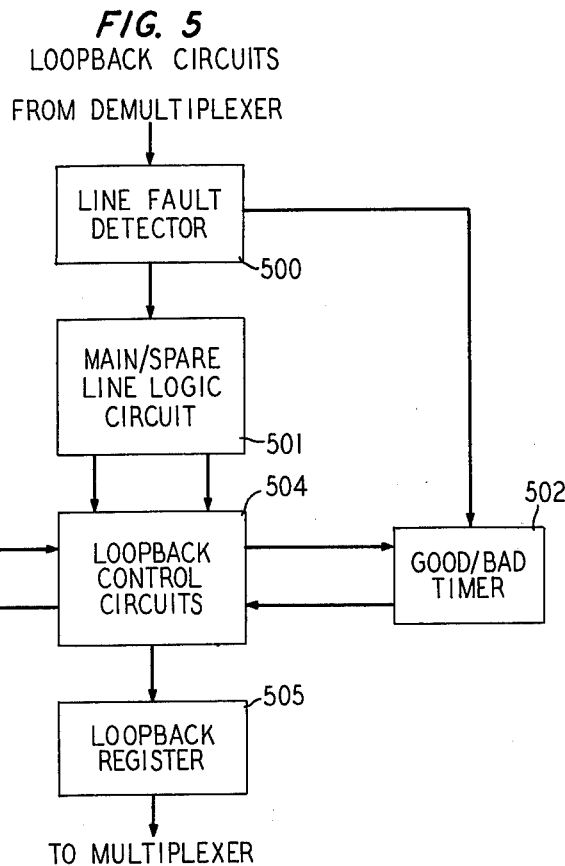
FIG. 5 is a more detailed block diagram of the loopback circuits shown in FIG. 2 to detect and correct for faults in the serial loop system in FIG. 1.

FIG. 5 is a block diagram of the loopback circuits 216 shown in FIG. 2. These loopback circuits comprise a line fault detector 500 which detects faults in the bit stream received by the multiplexer-demultiplexer 208 in FIG. 2. Detector 500 not only detects individual faults but includes a counting circuit which requires the appearance of successive faults for a minimum period of time before signaling that a failure has occurred to the mainspare line logic circuits 501.

Logic circuits 501 control the switching of the system of FIG. 1 between the main lines 104 and 105 and the parallel spare lines 126 and 127. Logic circuits 501 also keep track of the occurrence of the faults on both the main and spare lines in order to control future switching back to the main line.

A good/bad timer circuit 502, under the control of logic circuits 501, monitors the connected line and determines whether the line should be cut out of service. Timer 502 performs this function not only for the entire main line and the entire spare line, but also performs this monitoring function for any partial system created by the addition and deletion of remote links during a loopback sequence.

A loopback timer circuit 503 insures that adequate time passes to permit all remote terminals to detect the loss of signals and to operate all local loopback relays at each remote terminal in preparation for a loopback testing sequence. Thus, the termination of signals on the loop is, in effect, a command to all remote terminals to remove all links by closing their loopback contacts.

Loopback control circuits 504 receive inputs from logic circuits 501 and timers 502 and 503 and operate to control these circuits as well as a loopback register 505. Register 505 is used to keep track of those remote links which have caused a failure to occur and thus should be left out of the system. Loopback register 505 also provides an indication to attendant personnel of which links in the system have caused the failure and thus records the system status. This information can, of course, be used to pinpoint the location of the fault and thereby assist in effectuating repairs to the system. Loopback register 505, in performing these functions, transmits signals via the multiplexer 208 (FIG. 2) indicating which of the loopback relays at the remote terminals are to be released to cut in a remote link which can then be tested to determine if it is fully operational and can be used.

Figure 6:
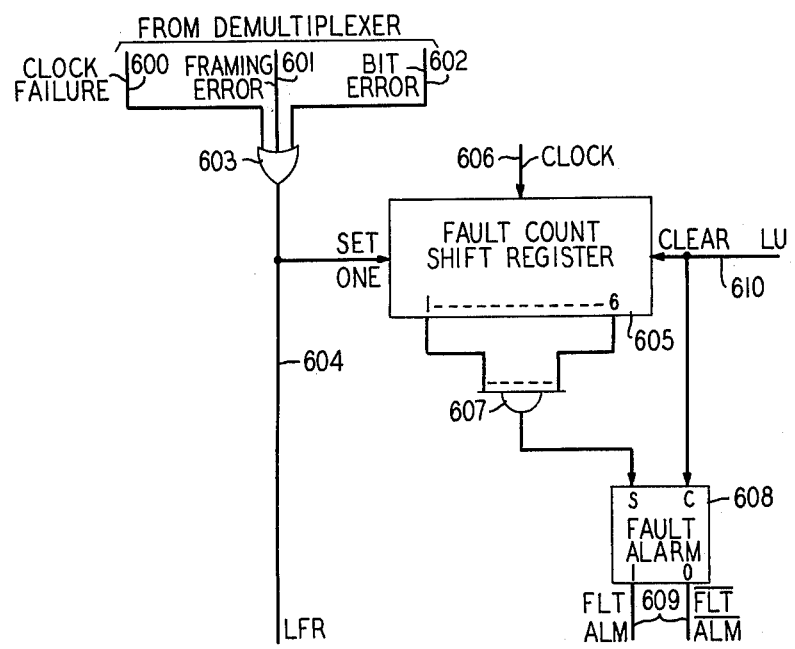
FIG. 6 is a detailed circuit diagram of a line fault detector shown in the loopback circuits of FIG. 5.

FIG. 6 is a detailed circuit diagram of the line fault detector shown as block 500 in FIG. 5. Specific fault indications from the demultiplexer are provided on lines 600, 601, and 602. In the illustrative embodiment, these faults comprise clock failure, framing errors, or bit errors, respectively. Clock failure is detected by monitoring the receiving clock output and producing a signal on line 600 when this clock output is interrupted. Such interruption can, of course, occur from a failure of clock recovery circuits themselves or from the loss of an input signal to drive these recovery circuits. In turn, the loss of the received signal can be due to a large number of problems including power failure, line discontinuities, or a failure in any of the remote transmission and repeater circuits.

Framing errors can be detected in the demultiplexer by a failure to find the proper framing signal in the time slot in which the demultiplexer is expecting it. This failure produces a signal on lead 601 and can be caused by faults in the multiplexer, line faults, and many other classes of failure. It is to be noted that a framing error can occur even though the receiving clock is indicated as being present on lead 600.

In accordance with the illustrative embodiment of the invention, even though the clock and framing signals are proper in the demultiplexer, the bit stream nonetheless includes a series of bit positions which circulate through the loop and return to the central terminal unchanged during proper operation. These bits can be used to detect bit errors. If the bit error rate exceeds a predetermined threshold, an error signal is produced on lead 602 indicating this condition.

All of the error signals on leads 600, 601, and 602 are applied to a logic OR gate 603, the output of which comprises a Line Fault Received (LFR) signal on lead 604. It is to be understood that the three inputs to OR gate 603 are merely illustrative of the many types of failure which may occur and be detected at the central terminal 100 in a system such as that shown in FIG. 1. Other types of errors can provide similar inputs to gates 603 to initiate failure correction procedures.

The output of OR gate 603 on line 604 is applied to fault count shift register 605 to set the first stage of register 605 to a ONE state. Shift register 605 is a multi-stage shift register under the control of shift signals on lead 606. In the illustrative embodiment, these clock signals on lead 606 appear at a 5PPS rate. Thus, if fault indications appear on lead 604 at least once in each 200 millisecond period, a sequence of ONES will be shifted through register 605 until the register is completely filled. AND gate 607 has inputs connected to each of the stages of register 605 and thus detects the coincidence of all ONES in register 605. The output of gate 607 indicates a presence of a fault of sufficient duration to require corrective action. This signal is used to set fault alarm (FLT ALM) flip-flop 608 and provide an output on leads 609 to initiate such corrective action.

When a new test cycle is initiated, a Lock Up (LU) control signal on lead 610 is used to clear shift register 605 and to reset fault alarm flip-flop 608.

Figure 7:
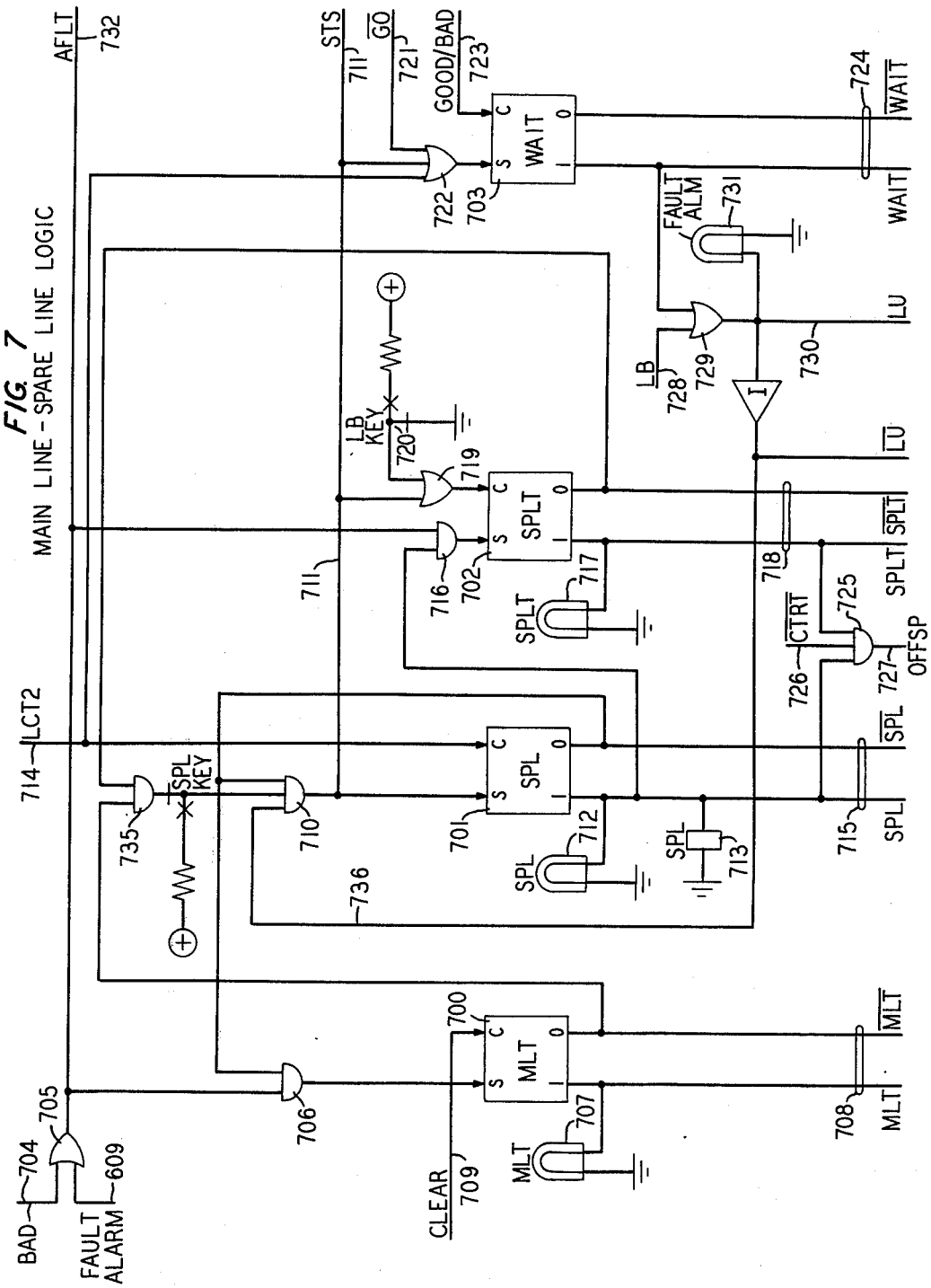
FIG. 7 is a detailed circuit diagram of the main line and spare line logic circuit shown in the loopback circuits of FIG. 5.

FIG. 7 is a detailed circuit diagram of the mainspare line logic circuit 501 of FIG. 5. It comprises four control flip-flops 700, 701, 702, and 703. Flip-flop 700 is the Main Line Trouble (MLT) flip-flop which indicates that a failure has been detected on the main line of the system of FIG. 1. Spare Line (SPL) flip-flop 701 controls the actual switching of the system from the main line to the spare line. Spare Line Trouble (SPLT) flip-flop 702 is used to indicate a failure on the spare line and therefore that a loopback test is required.

A FLT ALM signal on lead 609 from FIG. 6, indicating a failure on the line in operation, or a signal on lead 704, indicating a failure during a test sequence, are combined in OR gate 705 and applied to AND gate 706. The output of OR gate 705 is an All Faults (AFLT) signal on lead 732. If flip-flop 701 has not been previously set, indicating that the system is on the main line, then the AFLT signal sets MLT flip-flop 700, lighting MLT lamp 707 and providing an indication of this condition on output leads 708. MLT flip-flop 700 is reset by a clear signal on lead 709 derived as hereinafter described.

SPL flip-flop 701 is set by the output of AND gate 710, indicating that there is trouble on the main line and that switching to the spare line is in order. The output of gate 710 provides a Switch To Spare (STS) signal on lead 711 which is used in other parts of the loopback circuits. Gate 710, in turn, is enabled by the output of AND gate 735 or an SPL key. Gate 735 is controlled by the "O" output of flip-flop 701 and the O output of SPLT flip-flop 702. Gate 710 is controlled by an LU signal on lead 736.

When set, SPL flip-flop 701 lights SPL lamp 712 and operates SPL relay 713. Relay 713 performs the actual switching of the central terminal from the main line to the spare line as illustrated by the SPL transfer contacts in FIG. 1. SPL flip-flop 701 is cleared by a loopback timer output signal LCT2 on lead 714. The outputs of flip-flop 701 are provided on leads 715 as control signals to other portions of the circuit.

The SPLT flip-flop 702 is set by the output of AND gate 716, indicating the system is operating on the spare line and that a failure has been detected by OR gate 705. When set, flip-flop 702 lights SPLT lamp 717 and provides output signals on leads 718. SPLT flip-flop 702 is cleared by the output of OR gate 719, indicating that a switch to the spare line is occurring or in response to the operation of a manual loopback key including contacts 720.

WAIT flip-flop 703 is set by an STS signal on lead 711, by a LCT2 signal on lead 714 or by a GO signal on lead 721, all applied to OR gate 722. Each of these three inputs to gate 722 initiates a test period. WAIT flip-flop 703 is cleared by a signal on lead 723 indicating the completion of a test sequence. WAIT flip-flop 703 provides control outputs on leads 724 for use in the remainder of the circuit.

The ONE outputs of flip-flops 701 and 702 are combined in AND gate 725 with a $\overline{CTRT}$ signal on lead 726 indicating the status of the link between the control terminal and the first remote terminal. The switch from spare is thus permitted only if this first link is operative. If the system is operating on the spare line and trouble occurs on the spare line, and if the main line is operative at all, AND gate 725 will produce an output signal on OFFSP lead 727 to automatically initiate a switch back to the main line and a testing sequence of the remote links of the main line.

The ONE output of WAIT flip-flop 703 is combined with an LB control signal on lead 728 in OR gate 729 to generate a Lock UP (LU) signal on lead 730 to, among other things, clear the fault count shift register and the fault alarm flip-flop 608 in FIG. 6. The signal is also used to lock up the current assignments of channels to subscribers and locks up switchhook information to prevent calls from being dropped while a testing sequence takes place. This output also lights a fault alarm lamp 731 to indicate to attendant personnel that a fault has been detected and that a fault location sequence is in progress.

Figure 8:
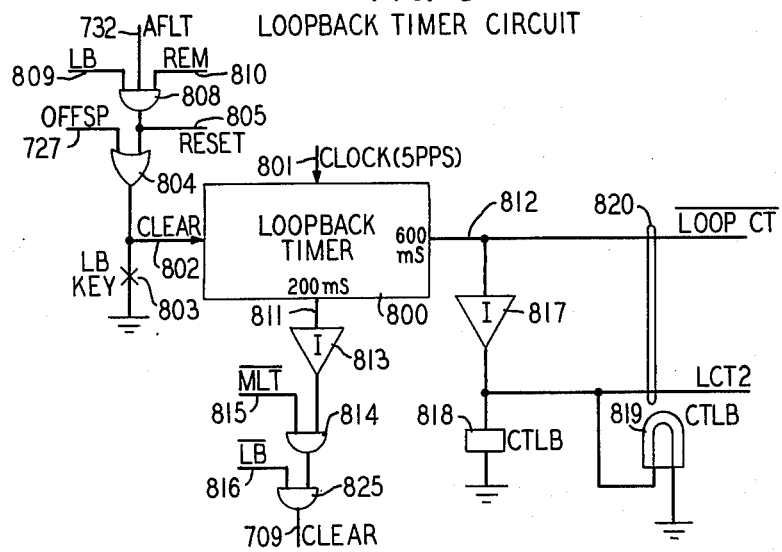
FIG. 8 is a detailed circuit diagram of a loopback timer circuit shown in the loopback circuits of FIG. 5.

FIG. 8 is a detailed circuit diagram of a loopback timer circuit suitable as loopback timer 503 in FIG. 5. The loopback timer circuit of FIG. 8 comprises a loopback timer 800 which is driven by a 5 PPS clock signal on lead 801. A timing cycle is initiated by removing all signals from lead 802 which permits timer 800 to advance through its timing cycle under the control of clock signals on lead 801. A signal on lead 802 can be generated by contacts 803 of a manual loopback key to initiate a loopback testing sequence. The signal on lead 802 can also be generated automatically by OR gate 804 which passes a RESET signal on lead 805 or the OFFSP signal on lead 727 from FIG. 7, indicating spare line trouble. The RESET signal on lead 805 is derived from AND gate 808 which combines a loopback (LB) signal on lead 809, an AFLT signal on lead 732 from FIG. 7, and a REM (Remove Loopbacks) control signal on lead 810.

The loopback timer of FIG. 8 provides two outputs on leads 811 and 812, respectively. Both of the signals on output leads 811 and 812 go low as soon as loopback timer 800 is cleared by a signal on lead 802. Lead 811 goes high one clock period (200 milliseconds) after timer 800 is cleared. The output on lead 812, on the other hand, goes high three clock periods (six hundred milliseconds) after timer 800 is cleared.

The output on lead 811 is inverted by inverter circuit 813 and is applied as one input to AND gate 814. AND gate 814 combines this signal with an $\overline{MLT}$ signal on lead 815. The output of gate 814 is combined with an $\overline{LB}$ signal on lead 816 in AND gate 825 to provide a CLEAR signal on lead 809 which is used in FIG. 7 to clear MLT flip-flop 700.

The output of timer circuit 800 on lead 812 is inverted by inverter circuit 817 and used to operate CTLB relay 818. As can be seen in FIG. 1, CTLB relay contacts loop central terminal 100 back on itself to deprive the entire serial loop transmission system of a bit stream input. This procedure initiates a process which results in establishment of all loopbacks at all remote terminals of the system. A CTLB lamp 819 indicates this condition to attendant personnel. The output of timer 800 also appears as control signals on output leads 820 for use in the remainder of the circuit.

Figure 9:
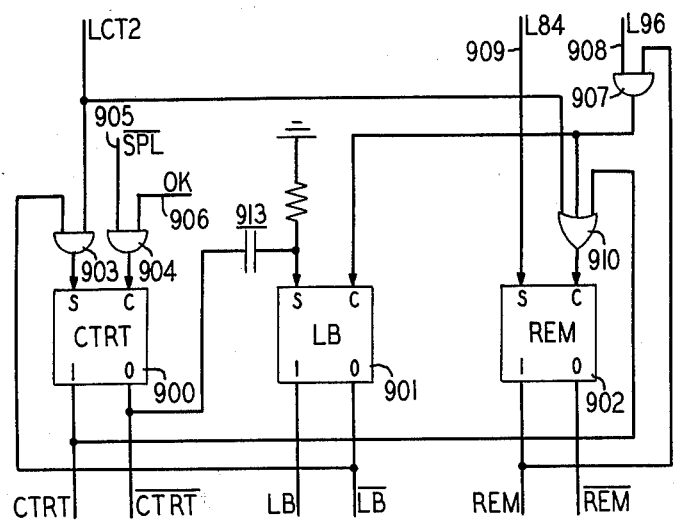
FIG. 9 is a detailed circuit diagram of the loopback control circuits shown in the loopback circuits of FIG. 5.

FIG. 9 is a detailed circuit diagram of the loopback control circuits 504 of FIG. 5 and comprises central terminal-remote terminal (CTRT) flip-flop 900, loopback (LB) flip-flop 901, and remove loopback (REM) flip-flop 902. CTRT flip-flop 900 is set by the output of AND gate 903 which combines the ZERO output of LB flip-flop 901 and the LCT2 output of the loopback timer of FIG. 8. CTRT flip-flop 900 is reset by the output of AND gate 904 combining a $\overline{SPL}$ signal on lead 905 and an OK signal on lead 906 from FIG. 10. Thus, CTRT flip-flop 900 is set at the beginning of a loopback sequence and is cleared when the test interval is completed and no failure has been detected.

LB flip-flop 901, which indicates the occurrence of a loopback testing sequence, is set when flip-flop 900 is cleared by differentiator circuit 913 and is itself cleared by the output of AND gate 907. Gate 907 combines the ONE output of REM flip-flop 902 with an L96 line code timing pulse on lead 908.

REM flip-flop 902, the output of which permits the transmission of remove loopback signals, is set by an L84 line code timing pulse on lead 909 and is reset by the output of AND gate 907. This output is combined in OR gate 910 with the LCT2 output of loopback timer 800 in FIG. 8, and with the ONE output of CTRT flip-flop 902. The outputs of flip-flops 900, 901, and 902 are used in the balance of the loopback circuits to control operations as will be described hereafter.

Figure 10:
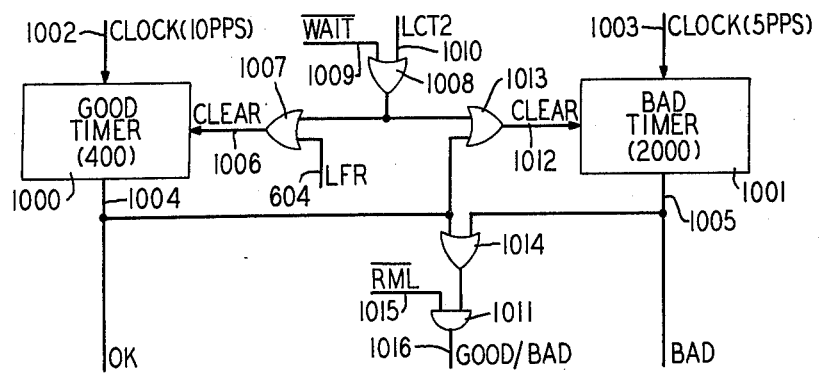
FIG. 10 is a detailed circuit diagram of the loop test timer shown in the loopback circuits of FIG. 5.

FIG. 10 shows a detailed circuit diagram of a loop test timer circuit comprising a good timer 1000 and a bad timer 1001. Good timer 1000 is driven by clock pulses on lead 1002 (10PPS from FIG. 3) while bad timer 1001 is driven by clock pulses on lead 1003 (5PPS, FIG. 3). Timers 1000 and 1001 proceed cyclically through a timing cycle in response to their respective clock inputs, producing an output signal on leads 1004 and 1005, respectively, at preselected intervals after a timing cycle is initiated. The timing period for time 1000 is 400 milliseconds while timer 1001 is 2000 milliseconds (2 seconds).

Good timer 1000 has a timing cycle initiated by removing clear pulses from lead 1006 derived from OR gate 1007. One input to OR gate 1007 is a LFR pulse on lead 604 from FIG. 6, indicating that a line failure has occurred. The other input to OR gate 1007 comes from OR gate 1008 which combines a $\overline{WAIT}$ pulse on lead 1009 from FIG. 7 and an LCT2 pulse on lead 1010 from the loopback timer of FIG. 8.

Bad timer 1001 similarly has a timing cycle initiated by the absence of clear pulses on lead 1012 derived from OR gate 1013. One input to OR gate 1013 is taken from OR gate 1008 while the other input is taken from the output of timer 1000 on lead 1004.

The outputs of timers 1000 and 1001 are combined in OR gate 1014 and applied to one input of AND gate 1011. The other input to AND gate 1011 is an inverted Remove Loopback ($\overline{RML}$) pulse on lead 1015. This pulse is derived in the circuits of FIG. 11 and indicates that loopback removal timing is taking place.

In operation, both of timers 1000 and 1001 start a timing cycle at the initiation of a test sequence as indicated by a $\overline{WAIT}$ or an LCT2 pulse. Good timer 1000 will time out after four hundred milliseconds if no line failures occur during that interval (as indicated by pulses on lead 604.) That is, an indication that the line is good by a signal appearance on OK lead 1004 takes place only if a four hundred millisecond interval times out and no line failure indications have taken place in that interval. This technique of requiring that the line be in continuous operating condition imposes considerably stronger requirements than previous systems requiring only fault-free operation during relatively brief sampling intervals. At the same time, the period is short enough to insure acceptance of the line operation with a minimum service interruption. Line faults during the start-up phase of the serial loop generate LFR pulses on lead 604 to continue recycling good timer 1000 until all of the start-up transients have subsided.

Bad timer 1001 is started at the same time but has a much longer timing interval (two seconds) before it will indicate the serial loop as bad on lead 1005. If the line is determined to be operational by good timer 1000, bad timer 1001 is immediately reset through OR gate 1013 to prevent any subsequent indication that the line is bad.

By combining the outputs of the good and bad timers 1000 and 1001 in OR gate 1014, a signal is developed by AND gate 1011 indicating that the loop test has been completed. The appearance of either of these signals represents the end of the testing interval. The appearance of this good/bad signal on lead 1016 is delayed by a signal on lead 1015 until after the current loopback removal signaling interval is completed, as will be described in connection with FIG. 11.

Figure 11:
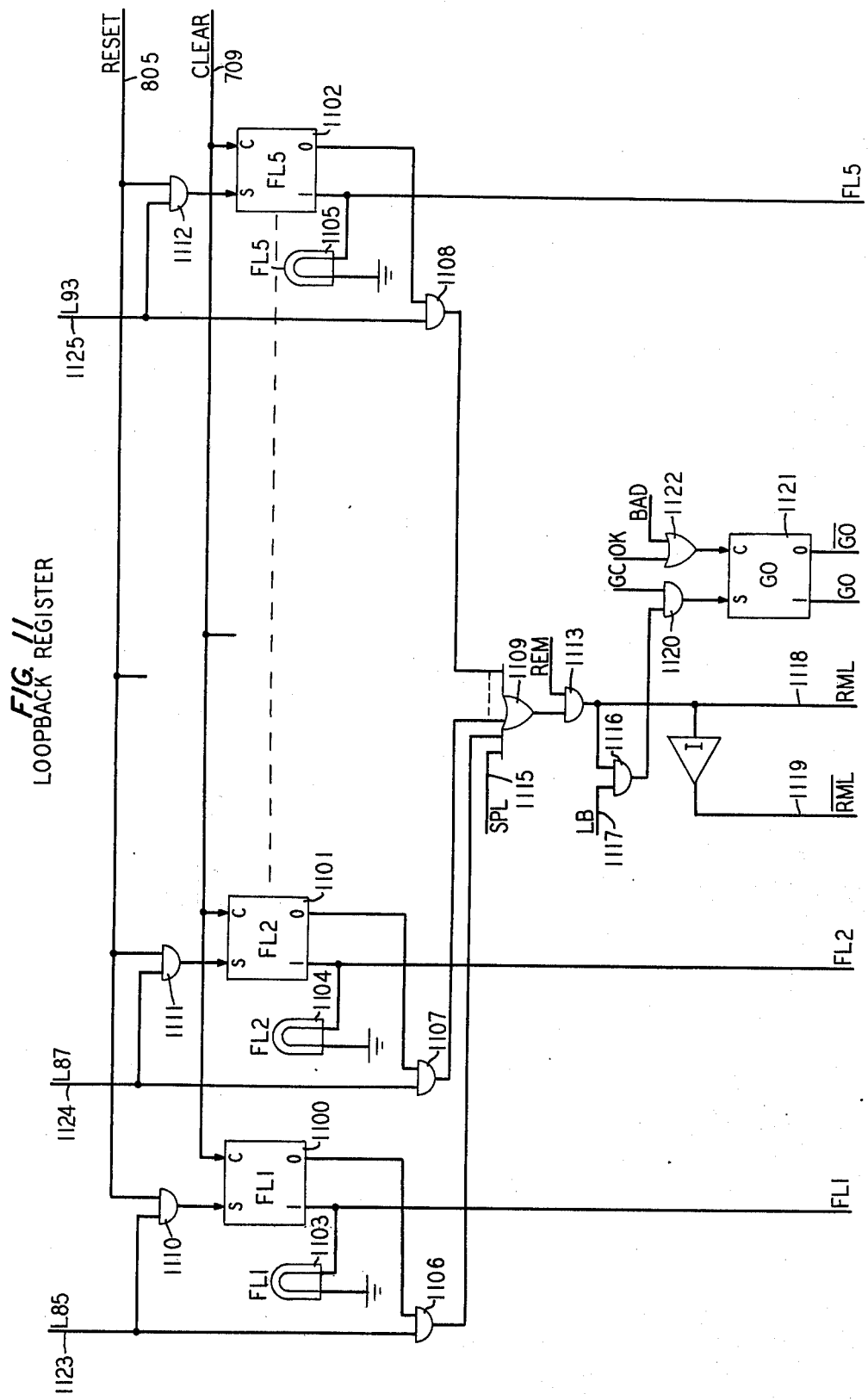
FIG. 11 is a detailed circuit diagram of the loopback register shown in the loopback circuits of FIG. 5.

FIG. 11 is a detailed circuit diagram of the loopback register 505 of FIG. 5 and includes a plurality of storage resisters 1100, 1101, and 1102. One such Fault in Loop (FL-) register is provided for each separate link in the serial loop transmission system of FIG. 1 except for the link extending from the central terminal to the first remote terminal, i.e., central terminal 100 to the remote terminal 101. This first link uses the CTRT flip-flop 900 for status registration. In general, the FL-flip-flops are used as memory elements to remember which of the links in the serial loop transmission system tested bad during a loopback sequence. Each of registers 1100, 1101, and 1102 has an alarm lamp (1103, 1104, and 1105, respectively) to indicate this condition to attendant personnel.

In normal operation, a coded remove loopback signal is sent once during each 128 frames of the bit stream shown in FIG. 4 (utilizing unused line codes in groups A, B, and C of cycle 1). As previously noted, 80 line codes are reserved to identify the 80 subscriber lines having access to the transmission system of FIG. 1. The line code generator 210 in FIG. 2, however, generates a sequence of 128 line codes; these unassigned line codes are therefore used for various signaling purposes. Five of the line codes (L85, L87, L89, L91, L93) can be reserved as signaling codes to request corresponding remote terminal loopback relays to be released. In normal operation, a remove loopback signal is sent once every 128 frames (every 125 milliseconds) for each loopback relay to disable the loopback relays. This insures the integrity of the system should a loopback relay be inadvertently operated during the normal operation of the system.

When a fault occurs, however, it is necessary to interrupt this normal flow of remove loopback signals as well as to indicate the fault to attendant personnel. In FIG. 11 a timing pulse corresponding to the line codes L85, L87, . . ., L93 appear in appropriate sequence on lines 1123, 1124, and 1125. These pulses are passed by AND gates 1106, 1107, and 1108, respectively, provided the corresponding ones of flip-flops 1100, 1101, and 1102 are in the reset condition. These timing pulses are combined in OR gate 1109 with an SPL pulse on lead 1115 and are used to control the transmission of the remove loopback codes as will be described below.

If a line failure occurs during a test cycle, a pulse appears on RESET load 805 (described in FIG. 8) to partially enable AND gates 1110, 1111, and 1112. If the corresponding line code pulse appears on one of leads 1123, 1124, or 1125, the appropriate one of flip-flops 1100, 1101, 1102 is set to register the fact that a failure has occurred during a test of the corresponding link of the serial loop system. A loopback test sequence is initiated by a CLEAR signal on lead 709 from the loopback timer circuit of FIG. 8.

The output of OR gate 1109 is combined in AND gate 1113 with an REM signal on lead 1114. AND gate 1113 is thus fully energized only during a test sequence for one of the loopback links and only during those frames designated for loopback removal signalng (REM).

The output of gate 1113 provides one input to AND gate 1116, the other input of which is a timing pulse on lead 1117. The output of gate 1113 is a RML pulse on lead 1118 and an inverted $\overline{RML}$ pulse on lead 1119. RML is connected to the multiplexer to insert remove loopback control codes.

The output of AND gate 1116 is applied to AND gate 1120, the output of which sets GO flip-flop 1121. The other input to AND gate 1120 is a timing pulse on lead 1122. The output of GO flip-flop 1121 controls the generation of line codes by way of gate 312 in FIG. 3. Thus, the generation of new line codes will proceed in sequence so long as GO flip-flop 1121 is cleared. During a fault location sequence, however, GO flip-flop 1121 is set by the output of AND gate 1120, indicating that a test sequence is in progress. The line code generator 210 in FIG. 2 therefore interrupts its normal sequence of line code generation and continues to generate the current line code for insertion into each and every frame of the bit stream of FIG. 4. This line code is, of course, a remove loopback code which is sent once each frame during the loopback test. This insures that a defective link is not remotely removed from service by the remote detection of the fault before the central terminal is itself able to detect that fault, since continuing commands to remove that loopback are being sent to the RTs.

The operation of the loopback circuits can be better understood by proceeding through a detailed description of a sequence of events which occur following the detection of a fault. Assuming the system is in operation on the main line and there are no trouble indications, a new failure indication is delivered by way of the line fault detector of FIG. 6. That is, the LFR lead gives a trouble indication which, after a preselected interval (e.g., 1.2 seconds), returns a FLT ALM signal. This FLT ALM signal on lead 609 enters gate 705 (FIG. 7) and sets MLT flip-flop 700 via AND gate 706. An MLT alarm lamp 707 is lit. When MLT flip-flop 700 is set, the CLEAR lead 709 (FIG. 8) is disabled at gate 814 by an $\overline{MLT}$ signal on lead 815. Simultaneously, gate 710 (FIG. 7) is fully enabled to generate an STS signal on lead 711, setting SPL flip-flop 701 and switching the system to the spare line by way of SPL relay 713. A spare line lamp 712 is lit at this time.

The STS pulse on lead 711, via OR gate 722, also sets WAIT flip-flop 703 which, in FIG. 10, starts the good and bad timers 1000 and 1001 to determine if the spare line is good. When SPL flip-flop 701 is thus set, gate 904 (FIG. 9) blocks the resetting of CTRT flip-flop 900. At the same time, AND gate 710 is disabled to terminate the STS pulse. AND gate 716 is partially enabled to permit SPLT flip-flop 702 to respond to a failure on the spare line. An SPL signal also enables OR gate 1109 (FIG. 11) and thus causes loopback removal signaling.

When WAIT flip-flop 703 is set by the STS pulse on lead 711, OR gate 729 permits a generation of a Lock Up (LU) pulse which clears the fault count register 605 in FIG. 6. The LU signal also maintains the previous central terminal status so that all line to channel assignments remain the same, loop closures are maintained, and no calls can be dropped.

When WAIT flip-flops 703 is set, the good and bad timers 1000 and 1001 in FIG. 10 are permitted to begin their time-out cycles. As described, the bad timer 1001 will generated a bad signal on lead 1005 two seconds thereafter unless the good timer 1000 generates an OK pulse on lead 1004 first. The good timer 1000, if not reset by any faults on the line, will generate an OK pulse on lead 1004 in 400 milliseconds, provided no line faults occur during this period.

If the spare line becomes good within two seconds, good timer 1000 times out, producing an OK output signal on lead 1004. This OK pulse clears the GO flip-flop 1121 (FIG. 11). A good/bad pulse is also generated on lead 1016 which clears WAIT flip-flop 703, thus resetting the good and bad timers and terminating their outputs. At this time the system has been switched to the spare line and the spare line has been tested as good. The system will continue to operate on the spare line in much the same fashion as it had previously been operating on the main line.

If the spare line is not operating within two seconds, a bad pulse will appear on the 1005. This bad pulse will generate a good/bad signal on lead 1016 via gates 1014 and 1011 to clear the WAIT flip-flop 700 and thereby clear the good and bad timers. This bad pulse also clears GO flip-flop 1121 via gate 1122. Finally, the bad pulse enters OR gate 705 via led 704 (FIG. 7) and will be gated through to set the SPLT flip-flop 702 through gate 716. It should be noted that if the spare line tested good, but at some later point in time a spare line failure occurred, the same sequence of events would be initiated by a FLT ALM signal on lead 609 operating through gates 705 and 716 to set SPLT flip-flop 702.

When thus set, SPLT flip-flop 702 lights SPLT lamp 717 indicating a spare line fault and enables AND gate 725. This produces an OFFSP pulse on lead 727. This OFFSP signal on lead 727 initiates a loopback sequence in the following way: Through AND gate 808 and OR gate 804, loopback timer 800 is cleared to start a loopback timing sequence for timing the period during which the control terminal will be looped back on itself, thereby removing all signals from the serial loop and thereby causing the operation of all the loopback relays at the remote terminals. The loopback sequence can also be initiated by manual LB key 803.

When cleared, loopback timer 800 removes the outputs from leads 811 and 812, causing outputs to appear at the outputs of inverters 813 and 817. The output of inverter 813 going high fully enables AND gate 814 to generate a CLEAR pulse on lead 709. This clear lead resets the MLT flip-flop 700 (FIG. 7) and clears all of the FL-flip-flops in FIG. 11 to prepare for a loopback test of the main line. LCT2 going high clears the good and bad timers in FIG. 10 via OR gates 1008, 1007, and 1013. It also sets WAIT flip-flop 703 (FIG. 7). The good and bad timers in FIG. 10, however, do not start a timing cycle due to the LCT2 signal on lead 1010. The LCT2 pulse on lead 714 also clears SPL flip-flop 701 which, in turn, extinguishes the SPL lamp 712 and releases SPL relay 713 to return the system to the main line. When SPL flip-flop 701 is reset, AND gate 725 is no longer enabled and the OFFSP pulse on lead 727 terminates.

The LCT2 pulse also clears REM flip-flop 902 (FIG. 9), via OR gate 910, in case this flip-flop had been set during the continuing process of sending remove loopback update codes to the remote terminals. The LCTz signal, via AND gate 903, sets CTRT flip-flop 900 which prepares for a test of the CT to RT1 link. Finally, as shown in FIG. 8, the LCT2 signal lights CTLB lamp 819 to indicate that the central terminal is looped back on itself and operates CTLB relay 818 to actually effectuate this condition. Contacts of CTLB relay 818 are shown in FIG. 1.

With the CTLB contacts operated, all signal transmissions to the serial loop are terminated. This loss of signal at the remote terminals causes them, after a time delay, to operate all of their loopback relays. The LCT2 signal can also be used manually by holding the LB key 803 operated to enable fault checking circuits in the central terminal. This permits exercising CT circuit which can only be checked when the central terminal is looped back on itself.

When loopback timer 800 in FIG. 8 has timed for two hundred milliseconds, output lead 811 goes high, disabling gate 814 through inverter 813. After another four hundred milliseconds (600 milliseconds in all) lead 812 goes high, releasing CTLB relay 818 and extinguishing CTLB lamp 819. At this time LCT2 goes low permitting good timer 1000 and bad timer 1001 to start running. At this point in time a digital bit stream is being transmitted to the first remote terminal 101 (FIG. 1) but all of the remaining line sections of the system are excluded due to the operation of their loopback relays. The first link between the central terminal 100 and the first remote terminal 101 is checked first to localize the trouble. Good timer 1000 and bad timer 1001 therefore continue to run until one or the other times out.

If the line section between the central terminal and the first remote terminal is bad, the bad pulse will set MLT flip-flop 700 via lead 704 and gates 705 and 706, lighting the MLT lamp 707.

If the first link of the system tests good, the OK pulse on lead 906 enables AND gate 904 to clear CTRT flip-flop 900. This causes LB flip-flop 901 to be set which, in turn, prevents CTRT flip-flop 900 from being set again on future LCT2 pulses. The LB pulse also operates through OR gate 729 (FIG. 7) to generate an LU pulse to hold lock up of the line to channel assignments. The LB pulse also blocks the generation of a clear pulse on lead 709 via AND gate 814. Finally, the LB pulse enables gate 1120 in FIG. 11 to permit GO flip-flop 1121 to be set.

The system now waits for the line scans to sequence to line scan 84 (L84). L84 sets REM flip-flop 902 via lead 909. When set, REM flip-flop 902 enables AND gate 1113 (FIG. 11) to permit the transmission of loopback removal signals. At this point, all of the FL- flip-flops 1100 through 1102 have already been cleared. Thereafter L85 lead 1103 goes high through gates 1106 and 1109 to enable the transmission of the remove loopback 1 (LB1) line code. At the same time, the RML signal on lead 1119 disables AND gate 1011 to prevent the generation of a good/bad pulse on lead 1016. GO flip-flop 1121 is set via gate 1120 to stop the line scanner in FIG. 3 on the line scan number L85. The GO output also sets WAIT flip-flop 703 via lead 721 and OR gate 722 to initiate a good/bad timing sequence. At this point, the line scanner is stopped at line code L85 and orders are being sent to the remote terminal in every frame to remove loopback 1 (LB1). The good/bad timer is running to determine if the first link is good.

The first remote terminal 101 of FIG. 1 responds to the remove loopback signal by releasing LB1 contacts at the remote terminal, thus inserting the link including lines 112 and 113 into the system. If this link is good, the OK lead 1004 goes high clearing GO flip-flop 1121 and releasing the line scanner to proceed. The L85 signal on lead 1103 therefore goes low and the line scanner proceeds through line codes L86 to L87. The loss of signal at gate 1106 disables AND gates 1113 and 1116 to terminate the RML signal on lead 1118. The good/bad pulse can therefore be propagated through AND gate 1011 to clear the good and bad timers.

When the line scanner reaches L87, the sequence of events is repeated. This time, however, the line code transmitted is that corresponding to the second loopback relay (LB2) and the second link is reinserted in the overall system. This link is similarly tested by the good/bad timer circuits and the process continues. The sequence continues through all of the remaining links until they are all found to be good or until one is found to be bad.

When a link under test causes a failure, a bad signal on lead 1005 from timer 1001 clears GO flip-flop 1121 through gate 1122 and generates an AFLT signal on lead 732. As previously noted, the bad signal also operates through OR gate 705 and AND gate 706 to set MLT flip-flop 700. The AFLT signal at gate 808 generates a RESET pulse on lead 805 to clear loopback timer 800 and to initiate an entire new loopback sequence, removing the signal from the line and reestablishing all of the loopbacks at the remote terminals. The clear signal, however, is blocked by the $\overline{LB}$ input to AND gate 825, thus allowing the FL- flip-flops 1100, 1101, and 1102 (FIG. 11) to remain set. The good and the bad timers are cleared by the LCT2 signal and are held that way while loopback timer 800 times out. The WAIT flip-flop 703 is set while REM flip-flop 902 is cleared, preventing any remove loopback signals from being sent. The reset pulse on lead 805 also enables AND gates 1110, 1111, and 1112, and the appropriate one of FL- flip-flops 1100, 1101 and 1102 is operated by the timing pulse on one of leads 1123 through 1125. The FL- flip-flop which is set will light the associated FL- lamp to indicate to attendant personnel that the failure has been detected in the corresponding link.

The loopback timer of FIG. 8 again times the period during which the central terminal 100 remains looped back on itself. After 600 milliseconds, the digital bit stream is restored to the loop. Meanwhile all the remote terminals have reoperated their loopback relays and a new sequence of loopback tests will be initiated. This time, however, the link which has already tested bad is marked by the associated FL- flip-flop and the remove loopback signals for this link are not transmitted. In this way, the remote links causing the failure are left looped out of the circuit while the balance of the system is being tested. This process of finding a faulty link, removing it from the system, and reinitiating a loopback sequence continues until all defective links have been found and marked by the corresponding FL- flip-flops. Eventually, the line scanner will reach the line code L96 on lead 908 without finding any new faults. This signal combines in AND gate 907 with a REM signal, clears LB flip-flop 901, and clears REM flip-flop 902. At the same time, the lock-up signal on lead 730 is terminated. The loopback process is now complete and the appropriate trouble lights are lit to represent which links are bad.

It can be seen that the loopback control circuits of the illustrative embodiment of the invention operate to continuously test the main line and, should a fault occur, immediately transfer the system to the spare line. If a fault occurs on the spare line, the system is reconnected to the main line and then a loopback test sequence is initiated. The system tests each link, one at a time, and locks out those links causing line failures. When complete, the system is allowed to continue operation on the operative portion of the system and thus provide service to the maximum number of subscriber loops.

Figure 12:
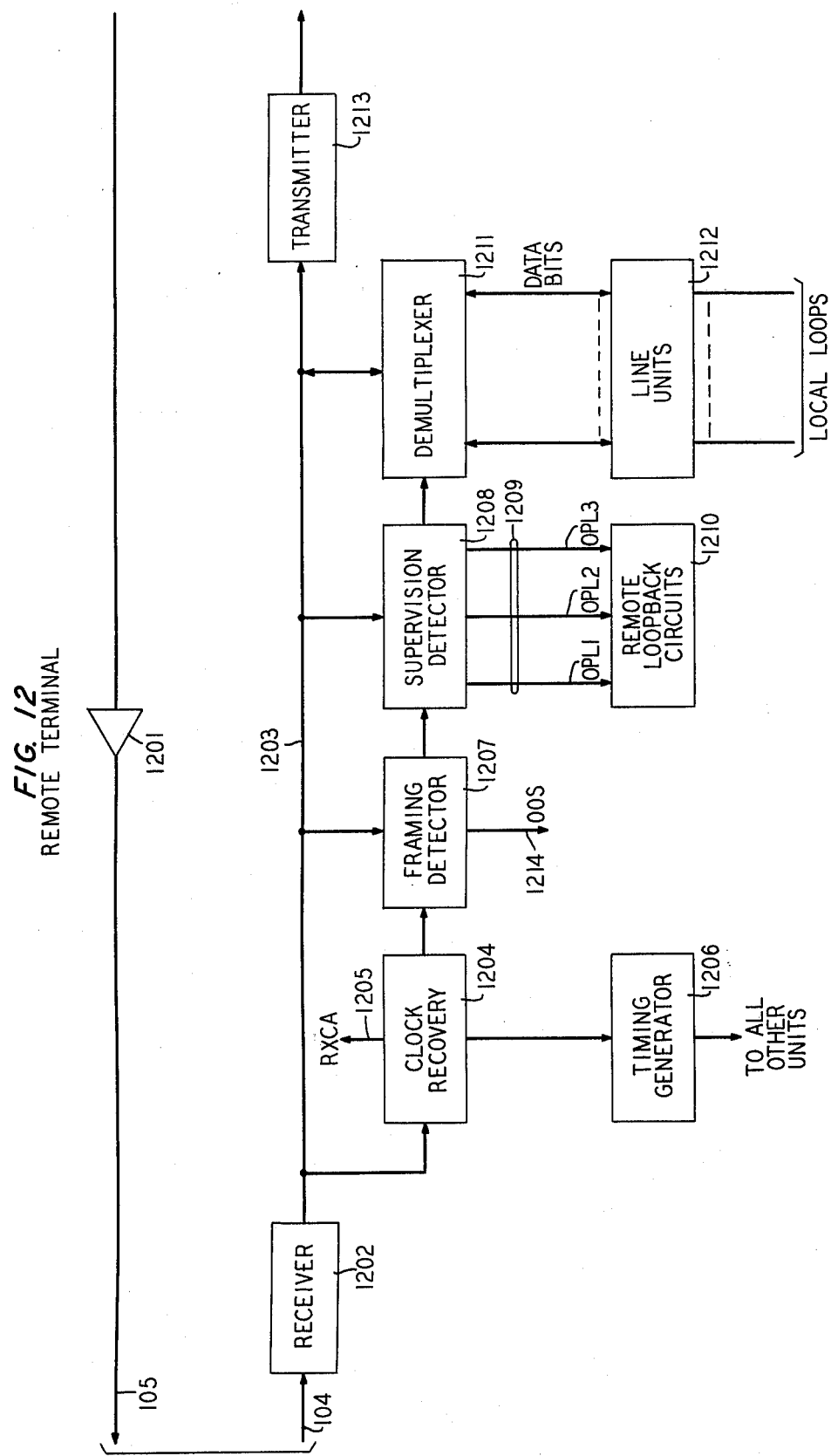
FIG. 12 is a detailed block diagram of the remote multiplex terminal of the serial loop transmission system of FIG. 1.

In FIG. 12 there is shown a block diagram of the remote terminal 101 shown in FIG. 1. The serial loop comprises an outgoing line 104 and an incoming line 105 as also shown in FIG. 1. Incoming line 105 includes a repeater 1201 which simply regenerates the pulses on the incoming line and transmits them back toward the central terminal. Messages on outgoing line 104, however, are demodulated in receiver 1202 and the pulse train of the form shown in FIG. 4 appears on bus 1203.

The basic pulse repetition rate on bus 1203 is used by clock recovery circuit 1204 to derive a clock signal at this basic pulse rate in accordance with standard clock recovery techniques. Clock recovery circuit 1204 provides a clock alarm signal on output lead 1205 indicating that a clock signal cannot be recovered due to the lack of an input signal. Clock recovery circuit 1204 also controls a timing generator 1206 which may be similar to the timing generator of FIG. 3 and generates the various pulse trains and timing signals for operating the balance of the remote terminal of FIG. 12.

Using the clock signals recovered by circuit 1204, framing detector 1207 detects the framing bit positions in the pulse train on bus 1203 by responding to the unique properties which are given to these pulse positions at the central terminal. When framing detector 1207 has correctly located the framing positions, framing pulses are applied to supervision detector circuits 1208 to recover the contents of the supervisory pulse positions assigned in Tables I and II. Framing detector 1207 produces an output OOS signal on lead 1209 indicating that correct framing has not been achieved and hence the remote terminal is Out of Synch (OOS).

Among the supervisory signals detected in detector 1208 are the line code bits in groups A, B, and C of cycle 1 (see Table I). Several of these line codes (L85, L87, L89, L91, and L93) are reserved for signaling for the removal of loopback connections at the remote terminals. These loopback removal signals are applied to appropriate ones of lead 1209 which are, in turn, connected to remote loopback circuits 1210.

The first 80 line codes are used in demultiplexer 1211 to connect appropriate time slots on bus 1203 to assigned ones of the line units in circuits 1212. Line units 1212 interface between the digital bit stream and the two-way analog telephone circuits.

Bus 1203 is connected to transmitter 1213 which remodulates these pulse signals and transmits them on to the next remote terminal.

In operation, data pulses are gated from bus 1203 under the control of timing signals from generator 1206 and line codes from supervision detector 1208 to deliver a sequence of digits to each line unit. The line units, in turn, decode the digital pulse codes to form analog signals which are then delivered to the local subscriber.

The local subscriber voice and supervisory signals are delivered to the line units 1212 where they are encoded into a digital pulse stream which is inserted by demultiplexer 1211 onto bus 1203 in precisely the same time slot in which signals were received for that line unit. These pulses circulate around the entire serial loop and return to the central terminal for detection and demodulation to complete the communication circuit.

Remote loopback circuits 1210 respond to various signals on bus 1203 to control the loopback relays LB1, LB2, and LB3, the contacts of which are shown in terminal 101 of FIG. 1. In general, the loss of signal caused by the termination of the entire bit stream is indicated by signal on lead 1205. This RXCA signal causes all three loopback relays to be operated and thereby to loop back all of the links in the serial loop system.

Thereafter, one link at a time is reinstated, beginning at the central office end of the loop, by transmitting "remove loopback" signals on the operative portion of the serial loop. As each new link is restored, it is tested for proper operation.

In order to insure that the removal of one loopback does not inadvertently cause the removal of other loopbacks at the same remote terminal and in order to insure that loopbacks are not inserted at intermediate remote terminals during tests of more remote links, loopback circuits 1210 include a delay in both the placement and the removal of the loopback. Furthermore, the placement delay is variable depending on whether or not a supervisory signal has been received ordering the removal of a local loopback. These various delays can be better understood in connection with FIG. 13 which is a detailed circuit diagram of the remote loopback circuits 1210.

Figure 13:
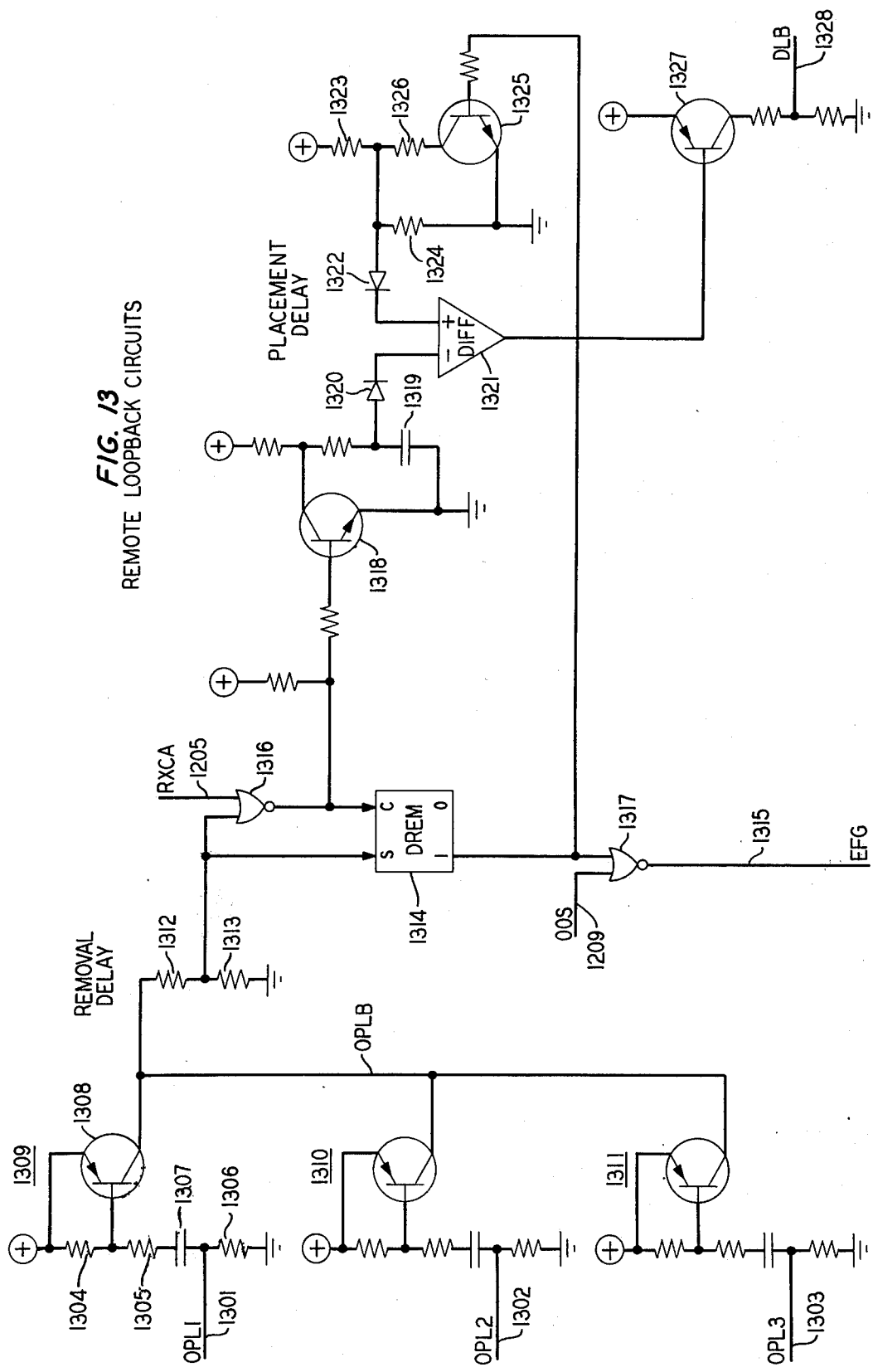
FIG. 13 is a detailed circuit diagram of the loopback control circuits at each of the remote terminals of FIG. 1.

In FIG. 13 the remove loopback signals appear on leads 1301, 1302 and 1303. These signals are applied to similar differentiator circuits 1309, 1310 and 1311. Differentiator 1309 include resistors 1304, 1305, 1306, and capacitor 1307. The midpoint of resistors 1304 and 1305 is connected to the base of transistor 1308. Circuits 1310 and 1311 are identical to circuit 1309 and the collectors of all of the corresponding transistors are connected together to provide an output signal across resistors 1312 and 1313.

Normally, the signals on leads 1301, 1302 and 1303 are low, since all LB relays are unoperated. After loss of signal due to CT loopback on itself, all LB relays are operated and the OPL- signals on leads 1301, 1302 and 1303 are high, holding the transistors corresponding to transistor 1308 in a cut-off condition. The receipt of a remove loopback signal is indicated by one of lines 1301, 1302, or 1303 going low. This negative-going transient causes the corresponding transistor to turn ON which, by way of voltage divider 1312-1313, sets DREM flip-flop 1314. When flip-flop 1314 is thus set, the EFG signal on lead 1315 goes low by way of NOR gate 1317, preventing the removal of any loopbacks.

After a period of time, the capacitor corresponding to capacitor 1307 charges to the point where the transistor corresponding to transistor 1308 no longer remains on. The signal therefore disappears across voltage divider 1312-1313 and, providing no RXCA clock alarm signal appears on lead 1205 (FIG. 12), flip-flop 1314 is cleared and one input removed from NOR gate 1317. Once the remote terminal is in synchronization, as indicated by the termination of the signal on lead 1209, the signal on output lead 1315 goes high to permit loopback removals.

In order to insure that intermediate remote terminals do not themselves reinsert loopbacks in response to failures caused by links further out in the serial loop system during a testing cycle, a variable time delay is provided for operating loopback relays. If a local loopback removal has been requested, a shorter delay is provided before providing the loopback. If no loopback removal signals have been received for this terminal, a longer placement delay is provided. These functions are provided by the circuit at the right-hand side of FIG. 13.

In particular, the output of gate 1316 is applied to the base of transistor 1318. Normally, transistor 1318 is ON to fully discharge capacitor 1319. When transistor 1318 is cut off by gate 1316, capacitor 1319 charges toward the supply voltage. The voltage across capacitor 1319 is applied through diode 1320 to one input of differential amplifier 1321.

The other input to differential amplifier 1321 is taken via diode 1322 from a voltage divider comprising resistors 1323 and 1324. In the presence of DREM flip-flop 1324 being set, transistor 1325 is turned ON to insert resistor 1326 into the voltage divider. This voltage divider, comprising resistors 1323, 1324, and 1326, provides the variable reference voltage to the other input of differential amplifier 1321 and thereby affects a variable delay in a time it takes capacitor 1319 to charge sufficiently to trigger differential amplifier 1321. When so triggered, differential amplifier 1321 operates transistor 1327 to provide an output signal on lead 1328 to operate all of the loopback relays in the remote terminal.

The circuits of FIG. 13 serve to provide all the necessary delays to insure the proper operation of the loopback sequence circuit disclosed in detail in connection with the central terminal. Thus, together with the circuits of the central terminal, they provide a complete loopback control system for selectively inserting and removing links of a serial loop system to permit testing one link at a time and restoring only those links to service which have tested good.

What is claimed is:

1. A serial loop transmission system comprising:
   a central station,
   a plurality of remote stations,
   a multiplex transmission line looped from said central station through each of said remote stations and back to said central station,
   loopback switching means at each of said remote stations responsive to loss of signals on said line for connecting said transmission line back on itself at each of said remote stations, and
   loopback control means at said central station, said loopback control means comprising:
   means for interrupting signals on said transmission line for a preselected period to operate said loopback switching means,
   timing means for timing both a minimum interval of successful operation of said system and for timing a maximum interval of unsuccessful operation of said system,
   signaling means for selectively controlling the disablement of each of said loopback switching means in sequence is response to the time out of said timing means.

2. The serial loop transmission according to claim 1 wherein said signaling means includes
   registration means for registering which portions of said serial loop system cause a time out of said maximum interval of unsuccessful operation.

3. The serial loop transmission system according to claim 1 further including
   a spare looped transmission line, and switching means, responsive to said timing means, for switching said stations from said multiplex transmission line to said spare line at the first maximum interval time out.

4. The serial loop transmission system according to claim 1 further including
means of each said remote stations for delaying the operation of said loopback switching means in response to said signaling means.

5. The serial loop transmission system according to claim 1 further including
means for enabling said signaling means to signal for the disablement of all of said loopback switching means at regular intervals when said loopback control means is otherwise not operative.

6. The serial loop transmission system according to claim 1 wherein said timing means comprises:
a good timer for timing out said minimum interval of successful operation with no intervening faults, and,
a bad timer for timing out said maximum interval os unsuccessful operation with no intervening time out of said good timer.

7. A fault detection circuit for a transmission system comprising
fault detector means for detecting a plurality of diverse faults in said transmission system,
fault sequence detector means for detecting a plurality of successive intervals in which faults occur,
a good timer responsive to the absence of detected fault sequences for timing out a first preselected minimum interval of fault-free operation, and
a bad timer responsive to said fault sequence detector for timing out a second preselected maximum interval of operation without a time out of said good timer.

8. The fault detection circuit according to claim 7 wherein said first preselected interval is substantially shorter than said second preselected interval.

9. In a serial data loop transmission system including a central station and a plurality of remote stations, a loop sectionalizing system comprising:
a sectionalizing switch at each of said remote stations,
signaling means at each central station for selectively controlling said sectionalizing switches, and
delay means at each of said remote stations for selectively delaying the operation of said sectionalizing switches at each of said remote stations not currently selectively controlled by said signaling.

10. The sectionalizing system according to claim 9 wherein said delay means comprises:
means responsive to said signaling means for altering the value of said delay, and
means responsive to the lack of data signals on said loop at each remote station for inhibiting the disablement of said sectionalizing switch at that remote station.

* * * * *